United States Patent [19]

Nakamura et al.

[11] Patent Number: 4,721,750
[45] Date of Patent: Jan. 26, 1988

[54] PRIMER COMPOSITION

[75] Inventors: Nobuo Nakamura; Tsuneo Motegi; Yasuji Matsumoto, all of Ohta, Japan

[73] Assignee: Toshiba Silicone Company, Ltd., Japan

[21] Appl. No.: 25,538

[22] Filed: Mar. 13, 1987

[51] Int. Cl.$^4$ .............. C08K 5/10; C08F 230/08; C08F 130/08; C08F 8/42
[52] U.S. Cl. ................... 524/533; 524/315; 524/547; 525/326.5; 525/361; 525/364; 525/365; 525/370
[58] Field of Search ............ 525/326.5, 361, 364, 525/365, 370, 362.2, 362.3; 524/533, 547, 315

[56] References Cited

U.S. PATENT DOCUMENTS

| | | | |
|---|---|---|---|
| 3,516,946 | 6/1970 | Modic | 525/326.5 |
| 4,043,953 | 8/1977 | Chang et al. | 525/326.5 |
| 4,191,713 | 3/1980 | Yonezawa et al. | 525/326.5 |
| 4,399,261 | 8/1983 | Kato et al. | 525/342 |
| 4,435,536 | 3/1984 | Kato et al. | 525/326.5 |
| 4,478,990 | 10/1984 | Kohno et al. | 525/326.5 |

*Primary Examiner*—Herbert J. Lilling
*Attorney, Agent, or Firm*—G. L. Loser; J. W. Harbour

[57] ABSTRACT

A primer composition comprising:
(A) 100 parts by weight of copolymer obtained by reacting
 (1) an acrylic compound represented by the following general formula:

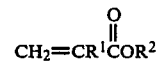

wherein $R^1$ and $R^2$ respectively represent groups selected from the group consisting of a hydrogen atom and monovalent substituted or non-substituted hydrocarbon group; with
 (2) a silane compound represented by the following formula:

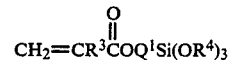

wherein $R^3$ represents a group selected from the group consisting of a hydrogen atom and monovalent substituted or non-substituted hydrocarbon groups, $R^4$ represents a monovalent substituted or non-substituted hydrocarbon group, and $Q^1$ represents a divalent hydrocarbon group having 1 to 6 carbon atoms,
 in the weight ratio of 0.1 to 1,000 wt % with respect to the component (1), in the presence of a free-radical initiator;
(B) 0.1 to 500 parts by weight of at least one compound selected from the group consisting of titanium alkoxides, titanium chelate compounds, aluminum alkoxides, aluminum chelate compounds, and iron salts of organic acids;
(C) 0.1 to 500 parts by weight of organo silicon compound having at least one unsaturated carbon, attached to a silicon atom, in a molecule;
(D) a platinum, palladium, or rhodium catalyst in an amount of 0.1 to 10,000 ppm in terms of each element of the platinum, palladium and rhodium with respect to the component (A); and
(E) an organic solvent in an amount of 250 to 3,500 parts by weight with respect to the total amount of (A) through (D) converted into 100 parts by weight.

7 Claims, No Drawings

PRIMER COMPOSITION

BACKGROUND OF THE INVENTION

The present invention relates to a primer composition and, more particularly, to a primer composition for bonding an RTV or heat cure, addition reaction type liquid silicone rubber to plastics, glasses and metals.

When a liquid silicone rubber is cured by addition reaction, polyorganosiloxane having alkenyl groups in a molecule and polyorganosiloxane having silicon-bonded hydrogen atoms are cured in the presence of a platinum catalyst at room temperature or under heating to at most 200° C. Such a silicone rubber does not produce any reaction by-product, and is excellent in electrical insulating properties, heat resistance, low temperature resistance, moisture resistance, ultraviolet light resistance, and so forth. These properties make it desirable for use as an encapsulating material, a casting material and the like for electric and electronic application.

Acrylic resins and polycarbonate resins have recently been widely used as optical materials for laminated glasses, solar batteries and the like due to their transparency and other excellent properties. Transparent addition reaction type liquid silicone rubber is used as a potting material, a coating material, and a buffer material for such optical materials. Since such a liquid silicone rubber is generally poor in adhesion to plastic materials, various methods for providing adhesiveness have been adopted.

One of them is a method of adding a silane compound to a liquid silicone rubber composition as an additive, and another is a method of using a primer. The former method is disadvantageous in that the kinds of applicable plastics are greatly restricted. As to the latter method, various primers have been proposed, but no satisfactory primers, in particular, to acrylic resins and polycarbonate resins have hitherto been obtained.

Accordingly, it is an object of the present invention to provide a primer which is capable of providing good adhesiveness for bonding an addition reaction type liquid silicone rubber to plastics and glasses, in particular, to an acrylic resin and a polycarbonate resin.

DESCRIPTION OF THE INVENTION

As a result of the present inventors research, it has been found that a primer having the later-described composition is capable of providing good adhesiveness of addition reaction type liquid silicone rubber to a variety of substrates. The present invention provides a primer composition comprising:

(A) 100 parts by weight of copolymer obtained by reacting (1) an acrylic compound represented by the following general formula:

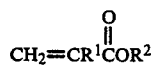

wherein $R^1$ and $R^2$ respectively represent groups selected from the group consisting of a hydrogen atom and monovalent substituted or non-substituted hydrocarbon groups; with (2) a silane compound represented by the following formula:

wherein $R^3$ represents a group selected from the group consisting of a hydrogen atom and monovalent substituted or non-substituted hydrocarbon groups, $R^4$ represents a monovalent substituted or non-substituted hydrocarbon group, and $Q^1$ represents a divalent hydrocarbon group having 1 to 6 carbon atoms, in the weight ratio of 0.1 to 1,000 wt% with respect to the component (1), in the presence of a free-radical initiator;

(B) 0.1 to 500 parts by weight of at least one compound selected from the group consisting of titanium alkoxides, titanium chelate compounds, aluminum alkoxides, aluminum chelate compounds, and iron salts of organic acids;

(C) 0.1 to 500 parts by weight of at least one organo silicon compound having at least one unsaturated carbon, attached to a silicon atom, in a molecule;

(D) a platinum, palladium, or rhodium catalyst in an amount of 0.1 to 10,000 ppm in terms of each element of the platinum, palladium or rhodium with respect to component (A); and (E) an organic solvent in an amount of 250 to 3,500 parts by weight with respect to the toal amount of (A) through (D) converted into 100 parts by weight.

Component (A) in the present invention is a copolymer of component (A) (1) and component (A) (2). The acrylic compound (A) (1) is represented by the following general formula:

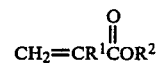

wherein $R^1$ and $R^2$ are as described above. $R^1$ is exemplified by a hydrogen atom; an alkyl group such as methyl group, ethyl group, propyl group, butyl group, amyl group, hexyl group, octyl group, decyl group and dodecyl group; an aryl group such as phenyl group; an aralkyl group such as 2-phenylethyl group and 2-phenylpropyl group; and a substituted hydrocarbon group such as chloromethyl group, cyanoethyl group and 3,3,3-trifluoropropyl group. A hydrogen atom and a methyl group are preferred because acrylic compounds having such groups are easy to synthesize and to handle in an uncured state. The same groups as those of $R^1$ are also used as $R^2$. As examples of component (1) will be cited

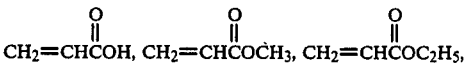

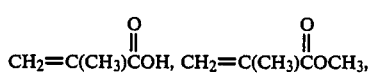

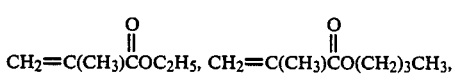

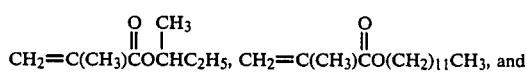

$$CH_2=C(CH_3)\overset{O}{\overset{\|}{C}}O(CH_2)_{17}CH_3.$$

The silane compound (A) (2) is represented by the following general formula:

$$CH_2=CR^3\overset{O}{\overset{\|}{C}}OQ^1Si(OR^4)_3$$

wherein $R^3$, $R^4$ and $Q^1$ are as described above. The same groups as those of $R^1$ are also represented by $R^3$. A hydrogen atom and a methyl group are preferable because silane compounds having such groups are easy to synthesize. $R^4$ is exemplified by an alkyl group such as methyl group, ethyl group, propyl group, butyl group, amyl group, hexyl group, octyl group, decyl group, and dodecyl group. Among them a methyl group, ethyl group and propyl group are preferable because they are easy to synthesize. As $Q^1$ a trimethylene group is the most preferable because such silane compounds are easy to synthesize and are stable.

As examples of the component (2) will be cited $$CH_2=CH\overset{O}{\overset{\|}{C}}O(CH_2)_3Si(OCH_3)_3,$$

$$CH_2=CH\overset{O}{\overset{\|}{C}}O(CH_2)_3Si(OC_2H_5)_3,$$

$$CH_2=CH\overset{O}{\overset{\|}{C}}(CH_2)_3Si(OC_3H_7)_3,$$

$$CH_2=C(CH_3)\overset{O}{\overset{\|}{C}}O(CH_2)_3Si(OCH_3)_3,$$

$$CH_2=C(CH_3)\overset{O}{\overset{\|}{C}}O(CH_2)_3Si(OC_2H_5)_3, \text{ and}$$

$$CH_2=C(CH_3)\overset{O}{\overset{\|}{C}}O(CH_2)_3Si(OC_3H_7)_3.$$

The mixing ratio of components (A) (1) and (A) (2) for obtaining a copolymer, component (A), is selected so that component (A) (2) is in the range of 0.1 to 1,000 wt%, preferably 10 to 500 wt% with respect to component (A) (1). If component (A) (2) is less than 0.1 wt%, good adhesiveness is not obtained, while if it exceeds 1,000 wt%, the storage stability of the composition becomes poor and, in addition, it is disadvantageous in terms of cost. The copolymerization reaction is carried out in an organic solvent in the presence of a free-radical initiator. The reaction temperature is in the range of room temperature to the reflux temperature of the solvent. In order to obtain an appropriate reaction time, the temperature is determined so that the half-value period of the initiator is 1 to 6 hours, preferably about 4 hours. The temperature at which the half-value period is about 4 hours varies depending on initiators. If the initiator is benzoyl peroxide, 2,4-dichlorobenzoyl peroxide, t-butyl peroxy 2-ethylhexanoate or azobisisobutylonitrile, the temperature is 60° to 90° C. In addition to the above, suitable initiators include organic peroxides, such as, di-t-butyl peroxide, and t-butyl perbenzoate; and azo-compounds. The amount to be used is not specified but about 0.05 to 1 wt% with respect to the total amount of the components (A) (1) and (A) (2) is preferred.

As the organic solvent used for the above-described reaction, aromatic hydrocarbons such as benzene, toluene and xylene; aromatic hydrocarbon halides such as chlorobenzene; alcohols such as as methanol, ethanol, propanol and butanol; esters such as ethyl acetate and propyl acetate; ketones such as acetone; and ethers such as ethyl ether and tetrahydrofuran are usable. The appropriate amount to be used is about two times that of component (A).

Component (B) in the present invention is at least one compound selected from the group consisting of titanium alkoxides, titanium chelate compounds, aluminum alkoxides, aluminum chelate compounds, and iron salts of organic acids. Compound (B) is essential for drying the primer composition, and for film formation and providing adhesiveness.

Suitable titanium alkoxides, include tetra-n-propyl titanate, tetra-n-butyl titanate and polymers thereof. Suitable titanium chelate compounds include, for example, titanium acetylacetonate. Suitable aluminum alkoxides, are exemplified by aluminum isopropylate and aluminum-sec-butylate. Exemplary aluminum chelate compounds are, aluminum trisacetylacetonate, aluminum tris(ethylacetoacetate) and ethylacetoacetate aluminum diisopropylate. Iron salts of organic acids suitable for use herein include iron naphthenate and iron octanoate.

The amount of component (B) to be used is 0.1 to 500 parts by weight with respect to 100 parts by weight of component (A). If it is less than 0.1 part by weight, a slow drying characteristic lowers the adhesiveness, while if it exceeds 500 parts by weight, a fast drying characteristic lowers the workability and the stability of the primer composition.

Component (C) in the present invention is an organo silicon compound having at least one unsaturated carbon attached to a silicon atom in a molecule, and is divided into two groups, namely, organosilanes and organosiloxanes.

As examples of organosilanes will be cited vinyl triethoxysilane, vinyl tris(2-methoxyethoxy)silane, vinyl triacetoxysilane, 3-methacryloxy propyltrimethoxysilane and vinyl methyldimethoxysilane.

As examples of organosiloxanes will be cited tetramethyl tetravinyl cyclotetrasiloxane, tetramethyl-1,3-divinyl disiloxane and a polyorganosiloxane represented by the following formula:

$$R^5\text{---}\begin{pmatrix}R^6\\|\\Si\text{---}O\\|\\R^6\end{pmatrix}_n\begin{matrix}R^6\\|\\Si\text{---}R^5\\|\\R^6\end{matrix}$$

wherein $R^5$ and $R^6$ independently represent aliphatic or aromatic groups, and at least one of them is an unsaturated carbon-containing group such as a vinyl group and a methacryloxy group.

Either only a single compound or a mixture of two or more compounds selected from the above may be used as component (C).

The amount of component (C) to be used is 0.1 to 500 parts by weight with respect to 100 parts by weight of component (A). If it leaves this range, the adhesiveness of the primer is lowered.

Component (D) in the present invention is a platinum, palladium or rhodium catalyst.

The platinum catalyst is exemplified by chloroplatinic acid, a complex of platinum and olefin, a complex of platinum and ketone, a complex of platinum and vinyl siloxane, platinum held by a carrier such as alumina or silica, and platinum black. The palladium catalyst is exemplified by tetrakis(triphenylphosphine)palladium and a mixture of palladium black and triphenylphosphine. As examples of rhodium catalysts, tetrakis(triphenylphosphine)rhodium and a mixture of rhodium black and triphenylphosphine will be cited. Only a single catalyst may be selected from these platinum, palladium and rhodium catalysts or they may be used together.

The amount of component (D) to be used is in the range of 0.1 to 10,000 ppm, preferably 1.0 to 5,000 ppm in terms of each element of the platinum, palladium or rhodium with respect to component (A). If it is less than 0.1 ppm, undercure is likely to be produced and special care is required in practical use, while a use of component (D) exceeding 10,000 ppm is economically disadvantageous.

The organic solvent (E) in the present invention must satisfy the conditions that (a) it is volatile, (b) it has good wettability to an adherend, (c) it can uniformly dissolve components (A) through (D), and (d) it does not dissolve or damage an adherend.

Examples of such organic solvents are alcohols such as methanol, ethanol, isopropylalcohol and n-butanol; aromatic hydrocarbons such as benzene and toluene; ketones such as acetone and methyl ethyl ketone; esters such as ethyl acetate, propyl acetate and butyl acetate; and aliphatic hydrocarbons. Only a single organic solvent or a mixture of two or more of these solvents may be used.

The mixing amount of component (E) is 250 to 3,500 parts by weight with respect to the total amount of (A) through (D) converted into 100 parts by weight. If it exceeds 3,500 parts by weight, the concentration of the components (A) through (D) becomes too low to produce uniform adhesiveness. On the other hand, if it is less than 250 parts by weight, the primer layer of the bond area becomes so thick as to deteriorate the adhesiveness.

A primer composition according to the present invention is obtained by mixing components (A) through (E). It is also possible to divide these components into a part consisting of the components (A), (C), (D) and (E) and a part consisting of the components (B) and (E) before use, and to mix these two parts when the primer composition is used.

A primer composition according to the present invention produces better adhesiveness than any conventional primer when an addition reaction type silicone rubber is bonded to an acrylic resin or a polycarbonate resin. Therefore, a primer composition of the present invention is very useful for wide use in bonding an addition reaction type silicone rubber to various kinds of plastics.

EXAMPLES OF THE INVENTION

The present invention will be explained hereinunder with reference to examples. In the examples, "part" means "part by weight".

EXAMPLE 1

50 parts of methyl methacrylate, 10 parts of 3-methacryloxy propyltrimethoxysilane, 60 parts of ethyl acetate and 60 parts of isopropyl alcohol were mixed, and 0.6 part of benzoyl peroxide was mixed thereto. The mixture was reacted at a temperature of 80° to 85° C. for 2 hours to obtain a copolymer solution $A_1$.

Tetrabutyl titanate, 3-methacryloxy propyltrimethoxysilane, vinyl triethoxysilane, a 2-ethylhexanol solution of chloroplatinic acid containing 2% platinum, and butyl acetate as a solvent were added to $A_1$ in the mixing ratios shown in Table 1 to prepare a primer composition $X_1$ of the present invention and primer compositions $Y_1$ to $Y_4$ for comparison.

Each of these primer compositions $X_1$ and $Y_1$ to $Y_4$ was thinly applied to polymethacrylate plates, Acrylite (trade name, produced by Mitsubishi Rayon Company Limited), with absorbent cotton, and was left for 30 minutes at room temperature to dry. Two-component type liquid silicone rubbers YE5822 (A), (B); TSE3033 (A), (B) and YE5626 (A), (B) (trade name, produced by Toshiba Silicone Co., Ltd) were prepared as addition reaction type liquid silicone rubber. The component (A) and (B) for each of the silicone rubbers were mixed and defoamed. Each of the defoamed silicone rubbers was poured between two polymethacrylate plates, which had been treated with the primers, and was heated at 80° C. for 2 hours to be cured. Thus, samples for adhesiveness evaluation were obtained.

The shear strengths of the samples obtained were measured by a tensile testing machine with an autographic recording device. The results are shown in Table 1.

TABLE 1

| | | Invention | Comparisons | | | |
|---|---|---|---|---|---|---|
| | | $X_1$ | $Y_1$ | $Y_2$ | $Y_3$ | $Y_4$ |
| Composition | Copolymer solution $A_1$ | 300 parts | 300 parts | 300 parts | 300 parts | 300 parts |
| | Tetrabutyl titanate | 10 parts | — | — | 10 parts | 10 parts |
| | 3-methacryloxy propyl trimethoxysilane | 50 parts | — | 50 parts | — | 50 parts |
| | 2-ethylhexanol solution of chloroplatinic acid (Pt:2%) | 10 parts | — | 10 parts | 10 parts | — |
| | Butyl acetate | 700 parts | 700 parts | 700 parts | 700 parts | 700 parts |
| Addition reaction type liquid silicone rubber used and Adhesiveness | YE5822 (A), (B) | | | | | |
| | Shear strength (kgf/cm$^2$) | 2.5 | 0.2 | 0.8 | 0.5 | 0.4 |
| | Cohesive failure ratio (%) | 100 | 0 | 20 | 0 | 0 |
| | TSE3033 (A), (B) | | | | | |
| | Shear strength (kgf/cm$^2$) | 3.0 | 0.4 | 0.9 | 0.5 | 0.4 |

TABLE 1-continued

|  | | Invention | Comparisons | | | |
|---|---|---|---|---|---|---|
|  | | $X_1$ | $Y_1$ | $Y_2$ | $Y_3$ | $Y_4$ |
|  | Cohesive failure ratio (%) | 100 | 0 | 20 | 0 | 0 |
|  | YE5626 (A), (B) | | | | | |
|  | Shear strength (kgf/cm$^2$) | 19.5 | 3.2 | 7.0 | 4.5 | 6.3 |
|  | Cohesive failure ratio (%) | 100 | 0 | 30 | 0 | 0 |

EXAMPLE 2

Primer compositions $X_2$ and $X_3$ according to the present invention were prepared by adding an isopropanol solution containing 75% of aluminum mono acetylacetonate bis ethylacetoacetate, 3-methacryloxy propyl trimethoxysilane, tetramethyl tetravinyl cyclo tetrasiloxane, octanol solution of chloroplatinic acid containing 2% of platinum, toluene solution of tetrakis(triphenylphosphine)rhodium containing 2% of rhodium, and butyl acetate to the copolymer solution $A_1$ in the mixing ratios shown in Table 2.

Adhesiveness tests were carried out in the same way as in Example 1 except that YE5626 (A), (B) was used as the addition reaction type liquid silicone rubber and was heated at 80° C. for 4 hours. The results are shown in Table 2.

TABLE 2

|  |  | Primer composition of the invention | |
|---|---|---|---|
|  |  | $X_2$ | $X_3$ |
| Composition | Copolymer solution ($A_1$) | 300 parts | 300 parts |
|  | IPA solution of aluminum-mono-acetyl acetonate-bis (ethyl acetoacetate) | 8 parts | 8 parts |
|  | 3-methacryloxy propyl trimethoxysilane | 5 parts | — |
|  | Tetramethyl tetravinyl cyclotetrasiloxane | 5 parts | 10 parts |
|  | Octanol solution of chloroplatinic acid (Pt: 2%) | 5 parts | 5 parts |
|  | Toluene solution of tetrakis (triphenyl-phosphine) rhodium (Rd: 2%) | 5 parts | 5 parts |
|  | Butyl acetate | 600 parts | 600 parts |
| Addition reaction type liquid silicone rubber used and Adhesiveness | YE5626 | | |
|  | Shear strength (kgf/cm$^2$) | 14.0 | 12.7 |
|  | Cohesive failure ratio (%) | 90 | 80 |

EXAMPLE 3

A primer composition $X_4$ of the present invention was prepared in the same way as in Example 1 except that 3 parts of 2-ethylhexanol solution of chloroplatinic acid containing 2% platinum and 13 parts of toluene solution of tetrakis(triphenyl-phosphine)palladium containing 2% Pd were used in place of 10 parts of 2-ethylhexanol solution of chloroplatinic acid containing 2% platinum. Adhesiveness tests were carried out in the same way as in Example 1 by using YE5626 (A), (B) as an addition reaction type liquid silicone rubber. The primer composition $X_4$ exhibited good adhesiveness; the shear strength was 13.2 kgf/cm2 and the cohesive failure ratio was 85%.

EXAMPLE 4

45 parts of ethyl methacrylate, 15 parts of 3-methacryloxy propyltrimethoxysilane, 60 parts of butyl acetate and 60 parts of isopropyl alcohol were mixed, and 1.0 part of azobis isobutylonitrile was mixed thereto. The mixture was reacted at a temperature of 80° to 85° C. for 4 hours to obtain a copolymer solution $A_2$.

5 parts of tetra(2-ethylhexyl)titanate, 1 part of iron octanoate (containing 6% Fe), 30 parts of 3-methacryloxy propyltrimethoxysilane, 10 parts of vinyl trimethoxysilane, 10 parts of isopropanol solution of chloroplatinic acid (containing 3% Pt), and 200 parts of ethyl acetate and 280 parts of butyl acetate as solvents were added to 180 parts of $A_2$ to prepare a primer composition. The primer was applied to plates of acrylic resin, nylon resin, epoxy resin and polycarbonate resin, and was air-dried at room temperature for 30 minutes. A two-component addition reaction type liquid silicone rubber TSE3033 (A), (B) was poured onto the respective plates which had been treated with the primer, and was heated at 70° C. for 4 hours to be cured. The adhesiveness was examined qualitatively by pulling the silicone rubber off the plate by hand. In each of the laminates, the cohesive failure was observed in the silicone rubber layer and no adhesive failure was observed at the interface. Thus, good adhesiveness was exhibited.

What is claimed is:
1. A primer composition comprising:
 (A) 100 parts by weight of copolymer obtained by reacting
   (1) an acrylic compound represented by the following general formula:

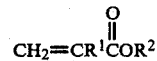

wherein $R^1$ and $R^2$ respectively represent groups selected from the group consisting of a hydrogen atom and monovalent substituted or non-substituted hydrocarbon group; with
   (2) a silane compound represented by the following formula:

wherein $R^3$ represents a group selected from the group consisting of a hydrogen atom and monovalent substituted or non-substituted hydrocarbon groups, $R^4$ represents a monovalent substituted or non-substituted hydrocarbon group, and $Q^1$ represents a divalent hydrocarbon group having 1 to 6 carbon atoms, in the weight ratio of 0.1 to 1,000 wt% with respect to the component (1), in the presence of a free-radical initiator;
(B) 0.1 to 500 parts by weight of at least one compound selected from the group consisting of titanium alkoxides, titanium chelate compounds, aluminum alkoxides, aluminum chelate compounds, and iron salts of organic acids;
(C) 0.1 to 500 parts by weight of organo silicon compound having at least one unsaturated carbon, attached to a silicon atom, in a molecule;
(D) a platinum, palladium, or rhodium catalyst in an amount of 0.1 to 10,000 ppm in terms of each element of said platinum, palladium and rhodium with respect to the component (A); and
(E) an organic solvent in an amount of 250 to 3,500 parts by weight with respect to the total amount of (A) through (D) converted into 100 parts by weight.

2. A primer composition according to claim 1, wherein $R^1$ in component (A) (1) is a hydrogen atom or a methyl group.

3. A primer composition according to claim 1, wherein $R^3$ in component (A) (2) is a hydrogen atom or a methyl group.

4. A primer composition according to claim 1, wherein $R^4$ in component (A) (2) is a methyl group, an ethyl group or a propyl group.

5. A primer composition according to claim 1, wherein $Q^1$ in component (A) (2) is a trimethylene group.

6. A primer composition according to claim 1, wherein the mixing ratio of component (A) (2) is 10 to 500 wt% with respect to component (A) (1).

7. A primer composition according to claim 1, wherein the mixing ratio of component (D) is 1.0 to 5,000 ppm with respect to component (A).

* * * * *